United States Patent
Cao et al.

(10) Patent No.: US 9,196,269 B2
(45) Date of Patent: Nov. 24, 2015

(54) HEAT SINK LAYER ALONG AN APERTURE OF A NEAR-FIELD TRANSDUCER

(71) Applicant: Seagate Technology LLC, Cupertino, CA (US)

(72) Inventors: Lina Cao, Bloomington, MN (US); Weibin Chen, Bloomington, MN (US); Werner Scholz, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/183,009

(22) Filed: Feb. 18, 2014

(65) Prior Publication Data

US 2015/0235658 A1  Aug. 20, 2015

(51) Int. Cl.
*G11B 5/23* (2006.01)
*G11B 5/31* (2006.01)
*G11B 5/40* (2006.01)
*G11B 5/00* (2006.01)

(52) U.S. Cl.
CPC .............. *G11B 5/314* (2013.01); *G11B 5/3116* (2013.01); *G11B 5/3133* (2013.01); *G11B 2005/0021* (2013.01)

(58) Field of Classification Search
None
See application file for complete search history.

(56) References Cited

U.S. PATENT DOCUMENTS

| 8,164,855 B1 | 4/2012 | Gibbons et al. |
| 8,320,220 B1 | 11/2012 | Yuan et al. |
| 8,451,555 B2 | 5/2013 | Seigler et al. |
| 8,988,827 B1* | 3/2015 | Balamane et al. ....... 360/125.31 |
| 2012/0050906 A1* | 3/2012 | Balamane et al. ............. 360/59 |
| 2014/0355399 A1* | 12/2014 | Huang et al. ............... 369/13.17 |

* cited by examiner

*Primary Examiner* — Craig A. Renner
(74) *Attorney, Agent, or Firm* — Hollingsworth Davis, LLC (57) ABSTRACT

A recording head includes a near-field transducer proximate a media-facing surface. The near-field transducer includes an aperture surrounded by walls of plasmonic material and a notch protruding within the aperture. The walls are oriented normal to the media-facing surface. A write pole is proximate the near-field transducer. The write pole has a back surface facing away from the media-facing surface and an aperture-facing surface proximate the aperture. A heat sink layer of the plasmonic material is disposed along the back surface and the aperture-facing surface of the write pole. The heat sink layer is thermally and optically coupled to the near-field transducer.

19 Claims, 8 Drawing Sheets

HEAT SINK LAYER ALONG AN APERTURE OF A NEAR-FIELD TRANSDUCER

BACKGROUND

A heat-assisted, magnetic recording (HAMR) data storage medium uses a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

SUMMARY

The present disclosure is related to a heat sink layer along an aperture of a near-field transducer. In one embodiment, a recording head includes a near-field transducer proximate a media-facing surface. The near-field transducer includes an aperture surrounded by walls of plasmonic material and a notch protruding within the aperture. The walls are oriented normal to the media-facing surface. A write pole is proximate the near-field transducer. The write pole has a back surface facing away from the media-facing surface and an aperture-facing surface proximate the aperture. A heat sink layer of the plasmonic material is disposed along the back surface and the aperture-facing surface of the write pole. The heat sink layer is thermally and optically coupled to the near-field transducer.

In another embodiment, a method involves propagating light via a waveguide from an energy source to a near-field transducer near a media-facing surface of a recording head. Surface plasmons are excited along walls of an aperture of the near-field transducer and along a notch protruding within the aperture. The walls are formed of a plasmonic material and are oriented normal to the media-facing surface. The walls and the notch direct the surface plasmons to a recording medium. A magnetic field is generated at the recording medium via a write pole proximate the near-field transducer. The write pole has a back surface facing away from the media-facing surface and an aperture-facing surface proximate the aperture. Heat from the near-field transducer is dissipated via a heat sink layer of the plasmonic material that is disposed along the back surface and the aperture-facing surface of the write pole.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to an apparatus (e.g., a HAMR read/write element) having an E-shaped or C-shaped aperture near-field transducer (NFT). Generally, this type of NFT includes a closed aperture surrounded by plasmonic material. The aperture is disposed along a direction of light propagation to a recording medium, and a notch protrudes within the aperture.

A HAMR read/write element, sometimes referred to as a slider or read/write head, includes magnetic read and write transducers similar to those on current hard drives. For example, data may be read by a magnetoresistive sensor that detects magnetic fluctuations of a magnetic media as it moves underneath the sensor. Data may be written to the magnetic media by a write coil that is magnetically coupled to a write pole. The write pole changes magnetic orientation in regions of the media as it moves underneath the write pole. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a near-field transducer (NFT) proximate a media-facing surface (e.g., air-bearing surface, contact surface). The NFT shapes and transmits the energy to a small region on the medium. The NFT is sometimes referred to as an optical antenna, surface plasmon resonator, etc., and may include a plasmonic metal such as gold, silver, copper, aluminum, etc., and alloys thereof. The NFT for a HAMR device is very small (e.g., on the order of 10 to 1000 nm, or any value therebetween) and creates a localized region of high power density in the media through an electromagnetic interaction. This results in a high temperature rise in a small region on the media, with the region exceeding the Curie temperature having dimensions less than 100 nm. This also results in high temperature rise in the slider near the NFT due to optical losses in the recording head.

Figure 1:
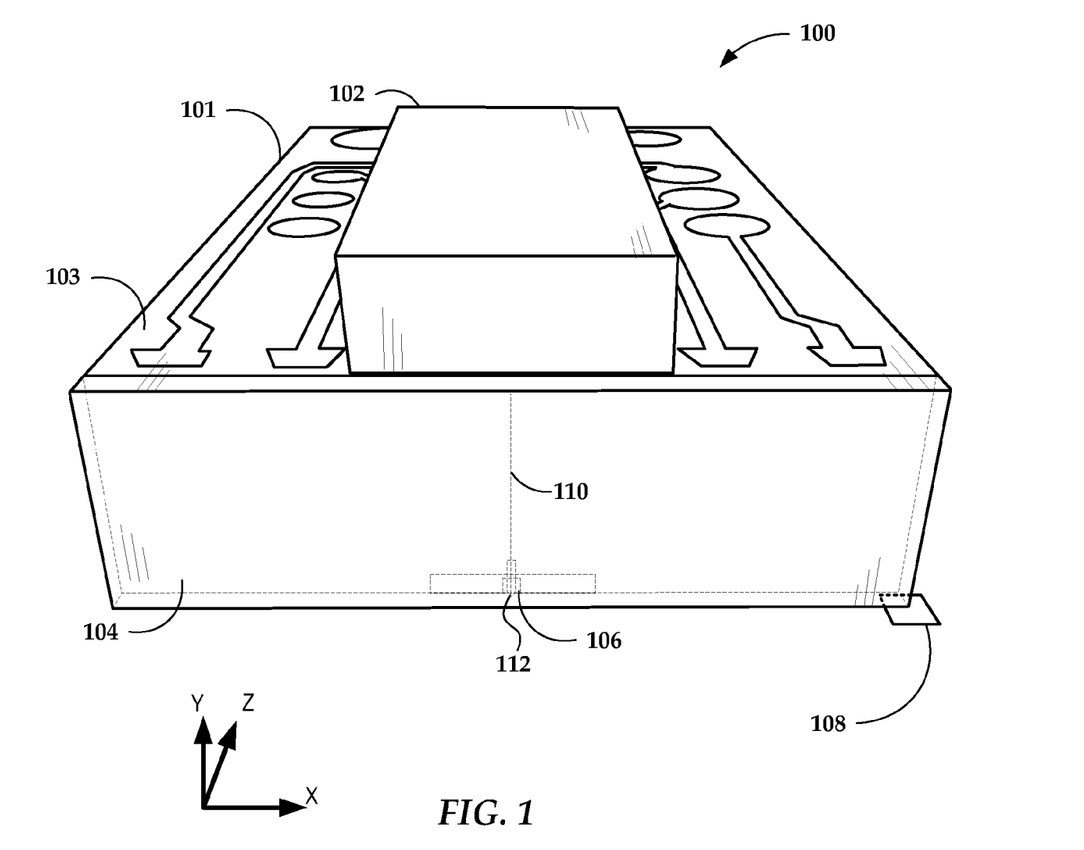
FIG. 1 is a perspective view of a recording head according to an example embodiment.

In reference to FIG. 1, a perspective view shows HAMR recording head 100 according to an example embodiment. The recording head 100 (also sometimes referred to as a slider) includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a NFT 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point at or near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
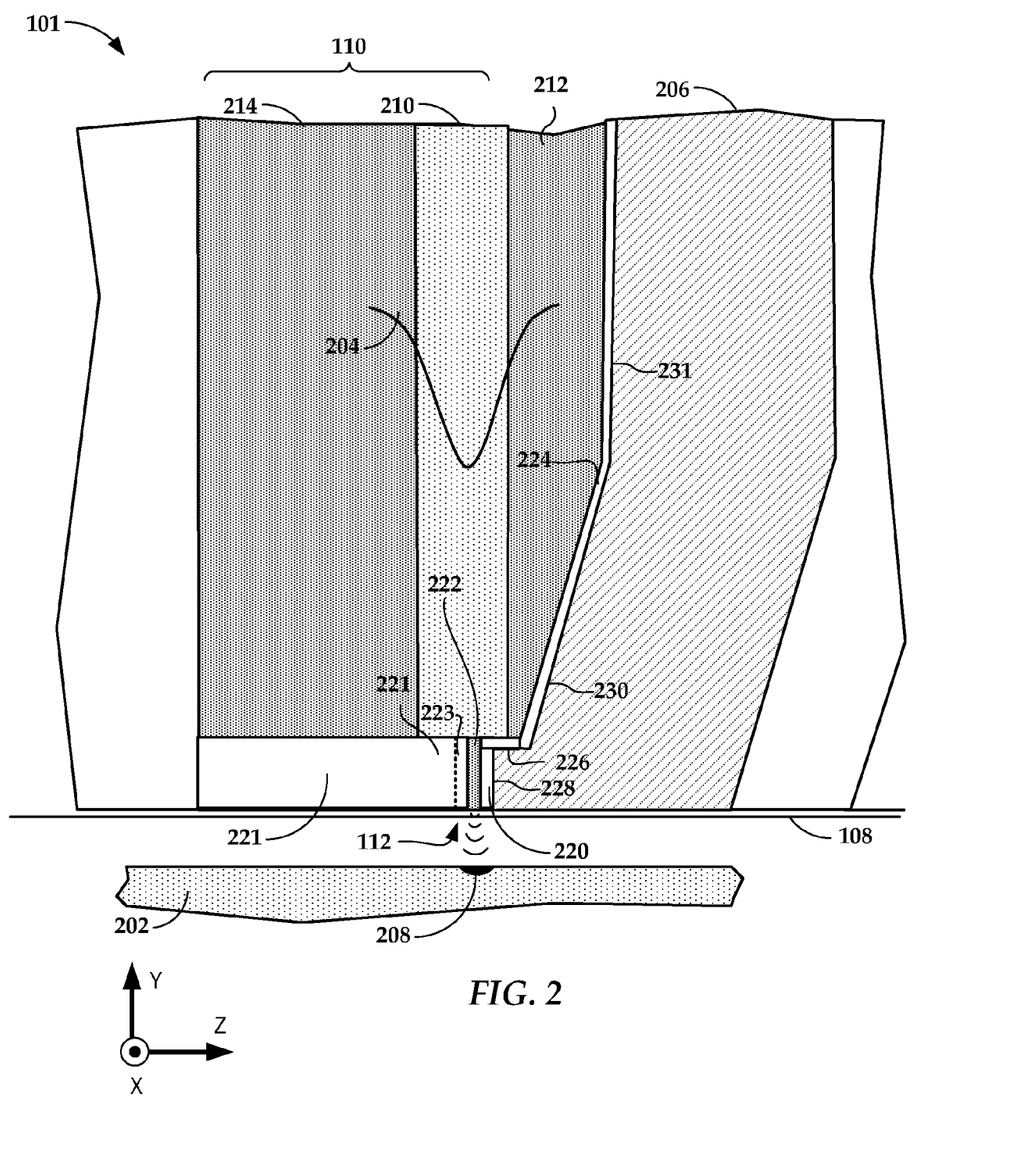
FIG. 2 is a cross sectional view of a recording head according to an example embodiment.

In FIG. 2, a cross-sectional view illustrates portions of the slider body 101 near the NFT 112 according to an example embodiment. In this view, the NFT 112 is shown proximate to a surface of magnetic media 202, e.g., a magnetic disk. The waveguide 110 delivers electromagnetic energy 204 to the NFT 112, which directs the energy 204 to create a small hotspot 208 on the media 202. A magnetic write pole 206 causes changes in magnetic flux near the media-facing surface 108 in response to an applied current. Flux from the write pole 206 changes a magnetic orientation of the hotspot 208 as it moves past the write pole 206 in the downtrack direction (z-direction).

The waveguide 110 includes a layer of core material 210 surrounding by cladding layers 212, 214. The core layer 210 and cladding layers 212, 214 may be made from dielectric materials such as $Al_2O_3$, $SiOxNy$, $SiO_2$, $Ta_2O_5$, $TiO_2$ or $Nb_2O_5$, etc. Generally, the dielectric materials are selected so that the refractive index of the core layer 210 is higher than refractive indices of the cladding layers 212, 214. This arrangement of materials facilitates efficient propagation of light through the waveguide 110.

The energy 204 applied to the NFT 112 to create the hotspot 208 can cause a significant temperature rise near the NFT 112. In this example, the NFT 112 includes plasmonic material portions 220, 221 that surround a closed aperture 222. The aperture 222 may be filled with a dielectric material, and surface plasmons are generated on surfaces of the aperture 222 that face this material. A notch 223 protrudes within the aperture 222. The plasmonic material may include a relatively soft metal (e.g., Au, Ag, Cu, Al, and alloys thereof) that is prone to mechanical instability at high temperature. The aperture 222 has a relatively small dimension in order to keep the generated plasmonic field small. The result is that energy is highly concentrated in a small region, resulting in high temperatures at and near the NFT 112.

In order to manage high temperatures, a heat sink layer 224 is formed proximate to (or integral with) the NFT 112. The heat sink layer 224 may be thermally coupled to other components (e.g., the write pole 206) in order to draw heat away from the NFT 112. For example, the heat sink layer 224 extends along a back surface 226 of the write pole 206. The back surface 226 of the write pole 206 faces away from the media-facing surface 108. The heat sink layer 224 also extends over an aperture-facing surface 228 of the write pole 206, e.g., may be part of or adjacent the first plasmonic material portion 220. As shown in this figure, heat sink layer 224 layer extends along surfaces 230, 231, part of which (e.g., the sloped surface 230) may be considered a combination of aperture-facing and back surfaces. The heat sink layer 224 may be both thermally and optically coupled to the near-field transducer. For example, at least part of the heat sink layer 224 covering the aperture facing surface 228 may generate surface plasmons in response to the energy 204, the surface plasmons being directed to the media 202.

Figure 3:
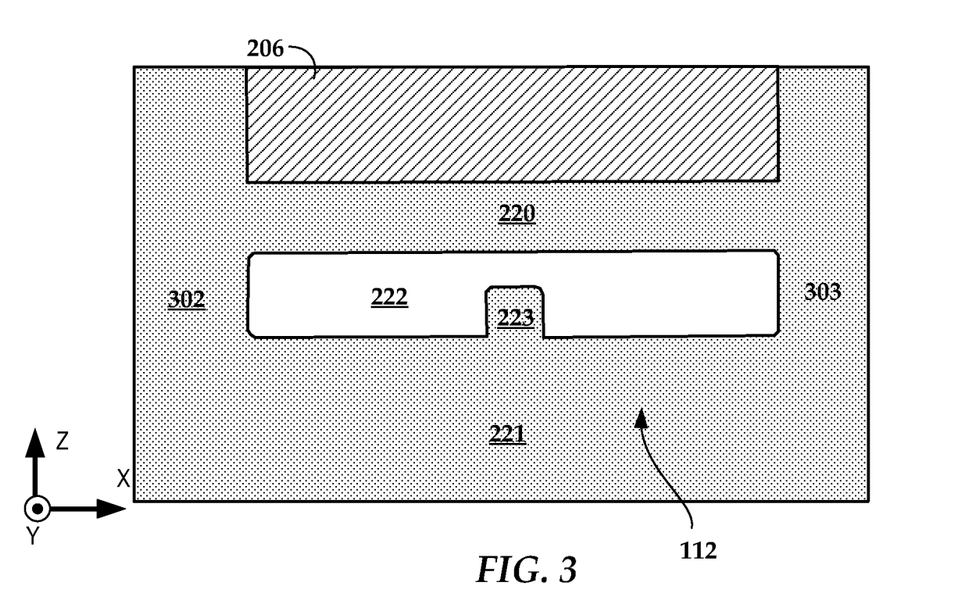
FIG. 3 is a plan view of a near-field transducer and write pole as seen from a media-facing surface according to an example embodiment.

In reference now to FIG. 3, a plan view shows the NFT 112 at a media-facing surface 108 according to an example embodiment. The x-axis in this figure is aligned in a cross-track direction, and the z-axis is aligned in a down-track direction. The aperture 222 is shown proximate an extension of the write pole 206. The plasmonic material portion 220 forms a top wall that separates the aperture 222 from the write pole 206. Side portions 302, 303 of plasmonic material form side walls surround the aperture 222 in the cross-track direction. Plasmonic portion 221 forms a bottom wall of the aperture 222. These walls are generally normal to the media-facing surface, and surface plasmon resonance causes surface plasmons to be directed in this normal direction to a recording media.

Figure 4:
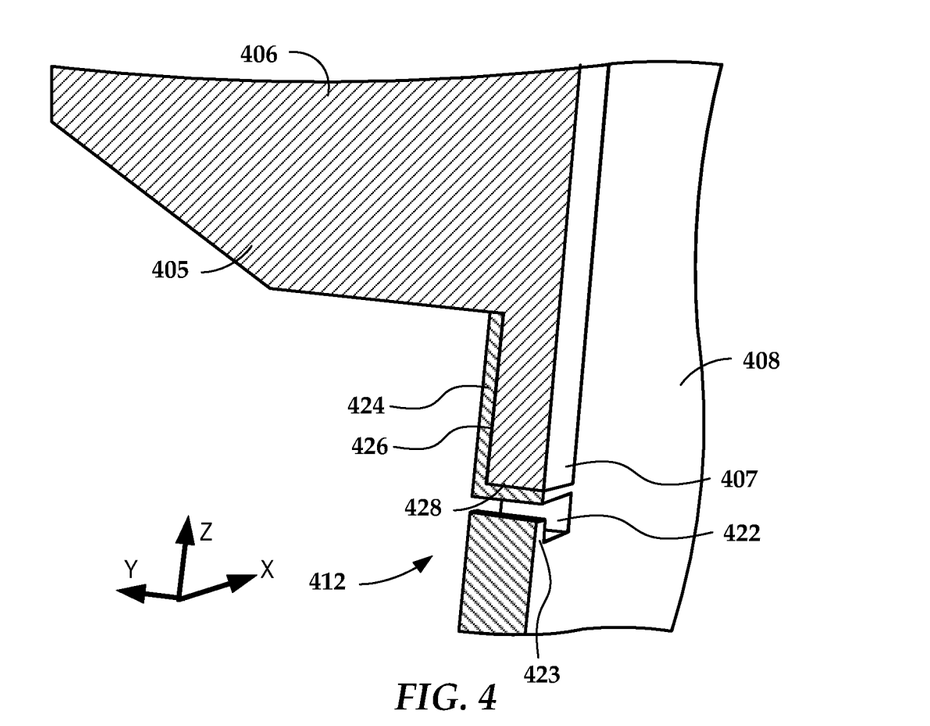
FIG. 4 is a cross-sectional, perspective view showing details of a near-field transducer and write pole according to an example embodiment.

In FIG. 4, a cross-sectional, perspective view shows details of an NFT 412 according to an example embodiment. The cross section is taken along a downtrack centerline of a recording head. The NFT 412 includes a closed aperture 422 and a notch 423 protruding therein. Omitted in this view is a filler material (e.g., dielectric) in the aperture 422, and a waveguide that delivers energy to the NFT 412 is also omitted for clarity.

A write pole 406 includes a downtrack extension 407 that extends from a sloped part 405 of the write pole 406. The extension 407 generates magnetic fields close to the NFT 412 at a media-facing surface 408 of the recording head. The extension has a reduced cross-section near the NFT 412. In this example the y-direction depth of the extension 407 is reduced compared to the y-direction depth of the sloped part 405. The cross-track dimension of the extension 407 may be also reduced compared to the sloped part 405, although in this view the extension 407 and sloped part are shown having the same cross-track dimension (x-direction). In this example, the reduced cross-section of the extension 407 is constant along a downtrack distance, although in other embodiments (e.g., FIGS. 11-12) the cross-section may vary along a downtrack direction.

A heat sink layer 424 (e.g., formed of plasmonic material) extends along a back surface 426 and aperture-facing surface 428 of the write pole extension 407. The back surface 426 is substantially parallel to the media-facing surface 408, and the aperture-facing surface 428 is substantially normal to the media-facing surface 408. In this example, the aperture-facing surface 428 of the write pole extension 407 directly faces (e.g., is parallel to) a top wall of the aperture 422. In other embodiments (e.g., FIGS. 5 and 6), the aperture facing surface may be at an angle to, but still facing, the aperture. The heat sink layer 424 is thermally and optically coupled to the NFT 412.

Figure 5:
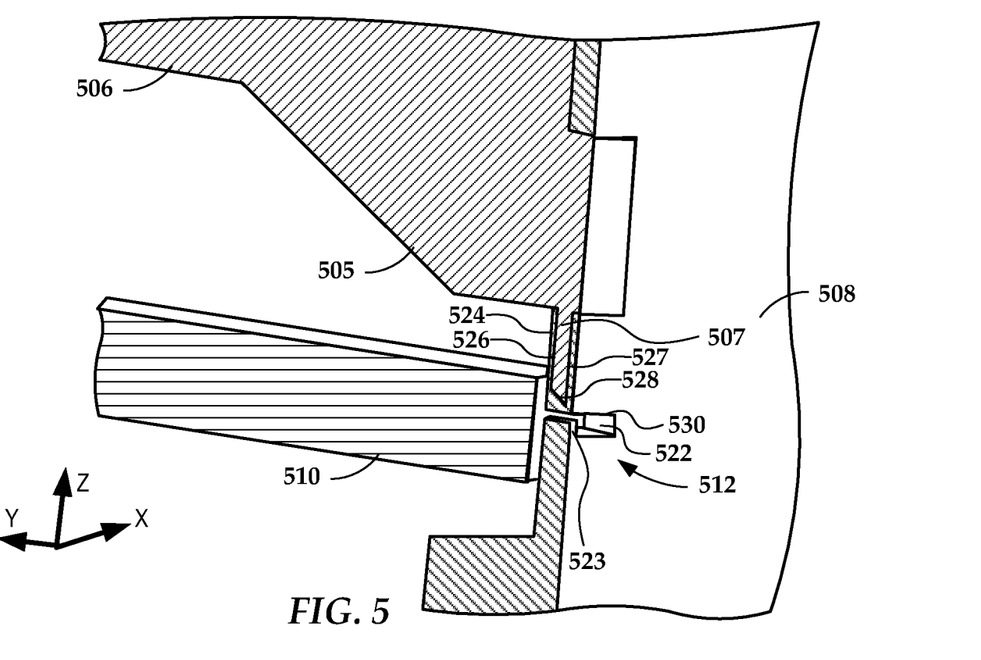
FIG. 5 is a cross-sectional, perspective view showing details of a near-field transducer and write pole according to another example embodiment.

In reference now to FIG. 5, a cross-sectional, perspective view shows details of an NFT 512 according to another example embodiment. The cross section is taken along a downtrack centerline of a recording head. The NFT 512 includes a closed aperture 522 and a notch 523 protruding therein. Omitted in this view is a filler material (e.g., dielectric) in the aperture 522. A core 510 of a waveguide that delivers energy to the NFT 512, although waveguide cladding and other surrounding materials are omitted for clarity.

A write pole 506 includes a downtrack extension 507 that extends from a sloped part 505 of the write pole 506. The extension 507 generates magnetic fields close to the NFT 512 at a media-facing surface 508 of the recording head. A heat sink layer 524 (e.g., formed of plasmonic material) extends along a back surface 526 and aperture-facing surface 528 of the write pole extension 507. The heat sink layer 524 is thermally and optically coupled to the NFT 512. The back surface 526 is substantially parallel to the media-facing surface 508. The extension 507 in this example includes a recessed region 527 that is recessed from the media-facing surface 508. The heat sink layer 524 covers the recessed region 527 at the media-facing surface 508. Any of the other embodiments described herein (e.g., FIGS. 4 and 6) may include a similar recessed region.

The aperture-facing surface 528 is at an angle to the media-facing surface 508, the angle being between normal (90 degrees) and parallel (0 degrees) and causing the aperture-facing surface 528 to be facing away from the media-facing surface 508. The portion of the heat sink layer 524 that covers the aperture-facing surface 528 also forms a top wall 530 of the aperture 522, and includes fill material so that the top wall 530 of the aperture 522 is normal to the media-facing surface 508 similar to the other walls that surround the aperture.

Figure 6:
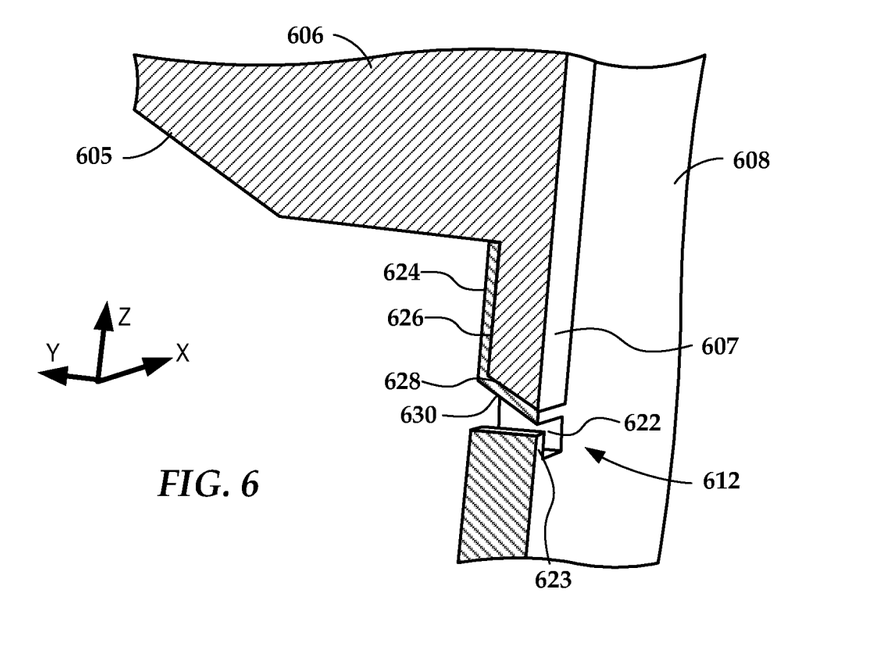
FIG. 6 is a cross-sectional, perspective view showing details of a near-field transducer and write pole according to another example embodiment.

In reference now to FIG. 6, a cross-sectional, perspective view shows details of an NFT 612 according to another example embodiment. The cross section is taken along a downtrack centerline of a recording head. The NFT 612 includes a closed aperture 622 and a notch 623 protruding therein. Omitted in this view are filler material (e.g., dielectric) in the aperture 622 and waveguide layers.

A write pole 606 includes a downtrack extension 607 that extends from a sloped part 605 of the write pole 606. The extension 607 generates magnetic fields close to the NFT 612 at a media-facing surface 608 of the recording head. A heat sink layer 624 (e.g., formed of plasmonic material) extends along a back surface 626 and aperture-facing surface 628 of the write pole extension 607. The heat sink layer 624 is thermally and optically coupled to the NFT 612. The back surface 526 is substantially parallel to the media-facing surface 508.

The aperture-facing surface 628 is at an angle to the media-facing surface 608, the angle being between normal (90 degrees) and parallel (0 degrees) and causing the aperture-facing surface 628 to be facing away from the media-facing surface 608. The portion of the heat sink layer 624 that covers the aperture-facing surface 628 also forms a top wall 630 of the aperture 622, and is formed in such a way that the top wall 630 of the aperture 622 is parallel to the aperture-facing surface 628 and at an angle to the media-facing surface 608. This can be contrasted with the NFT 512 shown in FIG. 5, in which all walls surrounding the aperture 522 are normal to the media-facing surface 508.

Thermal analyses were performed on some of the embodiments described above, and some results are shown in the graphs of FIGS. 7-10. One parameter determined via these analyses is media-to-head temperature ratio (MH ratio). A higher MH ratio minimizes thermal damage to components of the write head such as the NFT. In an existing E-aperture design without heat sink layers, MH ratio was found to be a rather low 1.54, even though other performance factors such as coupling efficiency and media heating for such a design is good. The results shown in FIGS. 7-10 show higher MH ratios, and still exhibit acceptable coupling efficiency performance.

Figure 7:
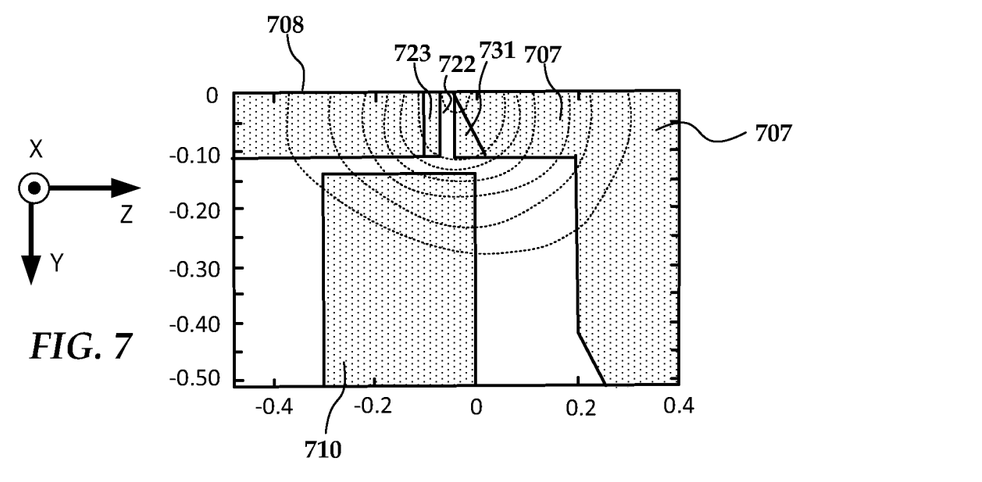
FIGS. 7-10 are graphs showing result of thermal analyses that were performed on recording heads according to example embodiments.

In the graph of FIG. 7, a downtrack cross section view illustrates thermal profiles of a write pole and NFT according to an example embodiment. The NFT includes an aperture 722 and notch 723 similar to the embodiments described above. A waveguide core 710 is located adjacent the aperture 722. A write pole extension 707 has a heat sink layer 731 of plasmonic material at an aperture-facing-surface. This layer 731 may also be formed of waveguide cladding material. This is similar to the arrangement shown in FIG. 5, except there is no heat sink material at a back surface of the extension 707. The dashed curves represent isotherms, and the maximum temperature is seen at the tip of the write pole extension 707 closest to media-facing surface 708. The MH ratio of this design is estimated to be 3.4.

Figure 8:
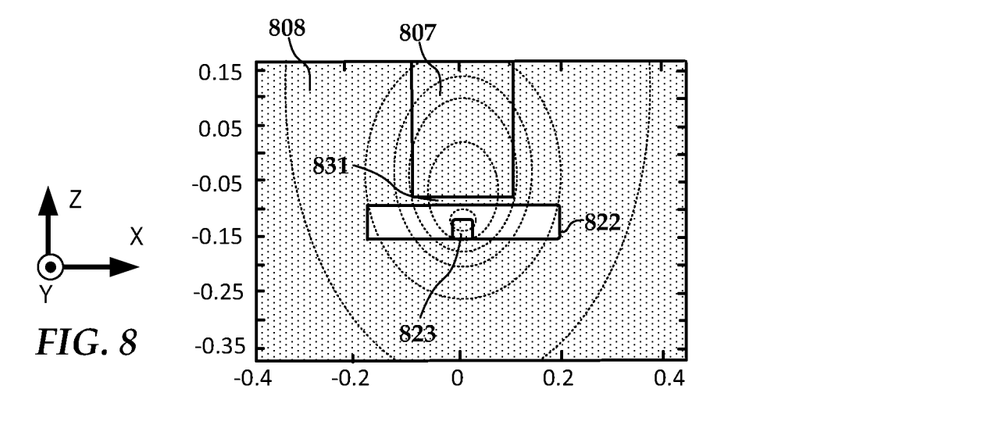

In the graph of FIG. 8, a plan view at a media-facing surface 808 illustrates thermal profiles of a write pole and NFT according to another example embodiment. The NFT includes an aperture 822 and notch 823 similar to the embodiments described above. A 10 nm coating heat sink layer 831 of plasmonic material (in this case, gold) is located between a write pole extension 807 and the aperture 822. This is similar to the arrangement shown in FIG. 5, except there is no heat sink material at a back surface of the extension 807, pole 807 cross track width is smaller than aperture 822 width as well. The dashed curves represent isotherms, and the maximum temperature is seen at the tip of notch 823. The MH ratio of this design is estimated to be 4.7.

Figure 9:
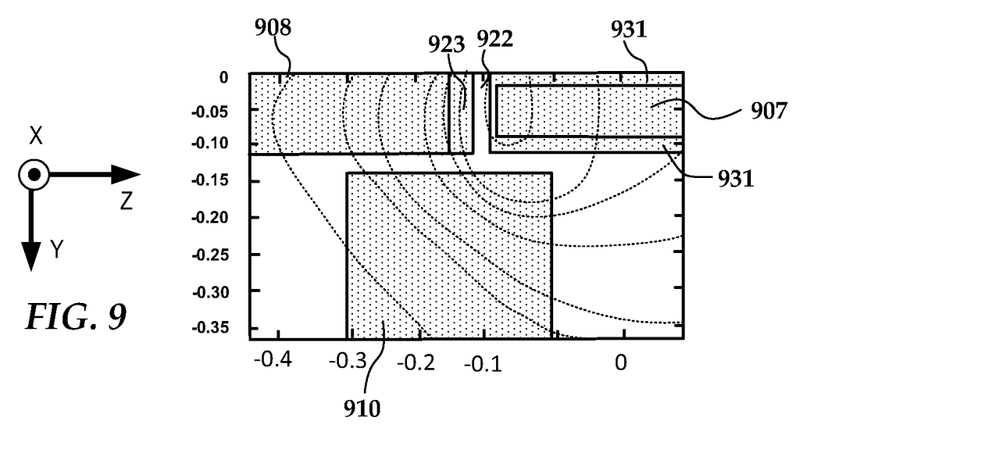

In the graph of FIG. 9, a downtrack cross section view illustrates thermal profiles of a write pole and NFT according to an example embodiment. The NFT includes an aperture 922 and notch 923 similar to the embodiments described above. A waveguide core 910 is located adjacent the aperture 922. A heat sink layer 931 of plasmonic material is located at an aperture-facing-surface of write pole extension 907, as well as front and back surfaces of the write pole extension 907. This is similar to the arrangement shown in FIG. 4, except that the write pole extension 907 is recessed from the media-facing surface 908 and this recessed portion is filled by the heat sink layer 931. The dashed curves represent isotherms, and the maximum temperature is seen at the tip of the write pole extension 907 close to the media-facing surface 908. The MH ratio of this design is estimated to be 3.6.

Figure 10:
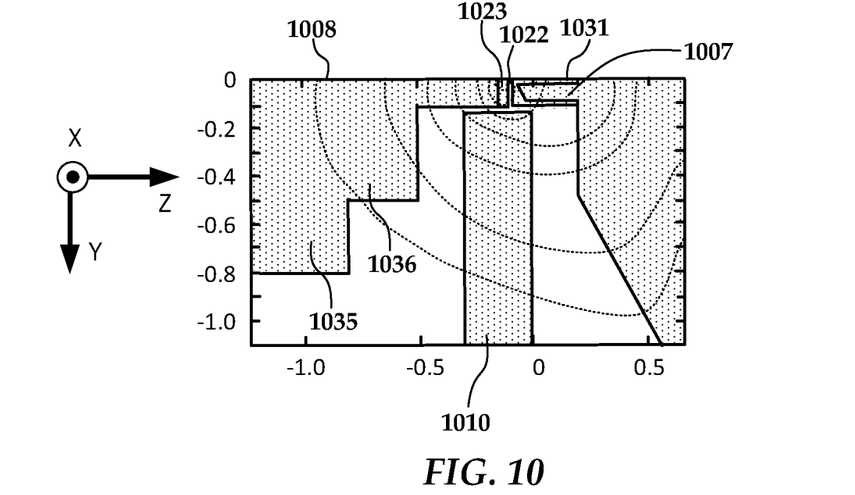

In the graph of FIG. 10, a downtrack cross section view illustrates thermal profiles of a write pole and NFT according to an example embodiment. The NFT includes an aperture 1022 and notch 1023 similar to the embodiments described above. A waveguide core 1010 is located adjacent the aperture 1022. A heat sink layer 1031 of plasmonic material is located at an aperture-facing-surface of write pole extension 1007, as well as front and back surfaces of the write pole extension 1007. This is similar to the arrangement shown in FIG. 5, e.g., the write pole extension 1007 is recessed from the media-facing surface 1008 and this recessed portion is filled by the heat sink layer 1031.

In this example, additional plasmonic materials (e.g., gold) form heat sinks away from the write pole as represented by heat sink regions 1035 and 1036. Generally, the heat sink regions 1035, 1036 include at least one portion of heat sink material coupled to a wall of the NFT opposite the heat sink (e.g., wall on which notch 1023 is located) and extending away from the media-facing surface 1008. In this example, region 1035 (which is farther from the write pole than regions 1036) extends further from the media-facing surface 1008 than region 1036. The dashed curves represent isotherms, and the maximum temperature is seen at the notch 1023 close to the media-facing surface 1008. The MH ratio of this design is estimated to be 6.1.

Figure 11:
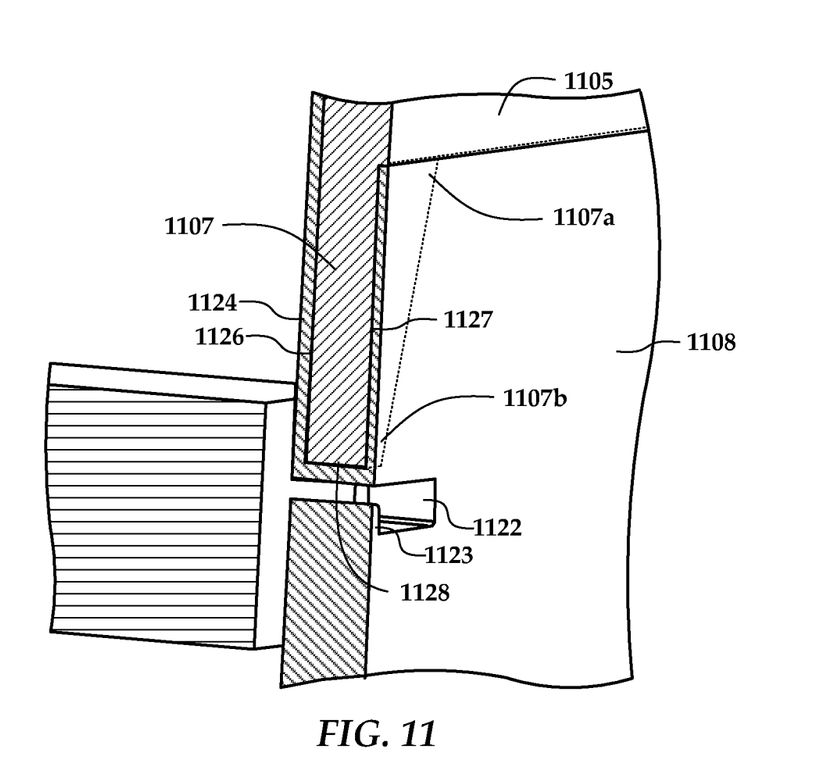
FIG. 11 is a cross-sectional, perspective view showing details of a near-field transducer and write pole according to another example embodiment.
Figure 12:
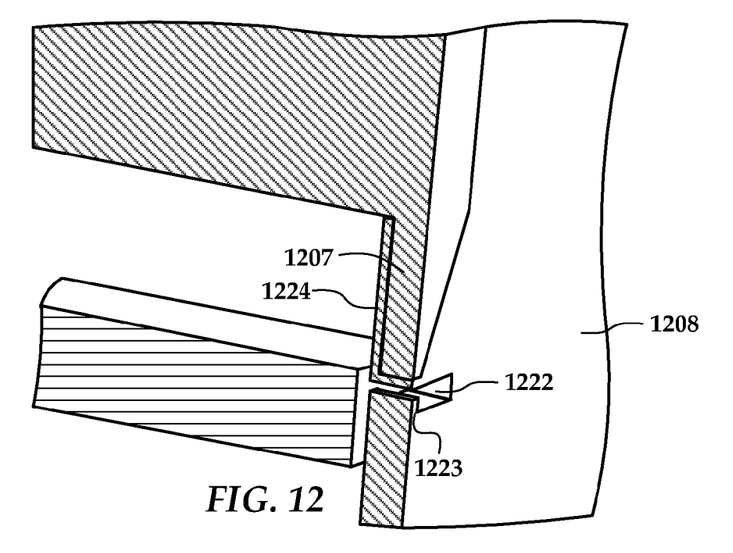
FIG. 12 is a cross-sectional, perspective view showing details of a near-field transducer and write pole according to another example embodiment.

In FIGS. 11 and 12, alternate write pole configurations are shown. In the previous embodiments, the write pole extension had a relatively constant cross-track dimension from where the extension extends from the main, sloped, part of the write pole to where the extension approached the NFT. This cross track width was also shown as roughly the same (e.g., 0.5-2 times) as a cross-track width of the aperture. In FIG. 11, a cross-sectional perspective view shows a tapered write pole extension 1107 according to an example embodiment. The write pole extension 1107 transitions from a wider portion 1107a near a main part 1105 of the write pole to a narrower portion 1107b near an NFT aperture 1122. The extension is coated by a heat sink layer 1124 on a back surface 1126, aperture-facing surface 1128 and recessed region 1127 near media-facing surface 1108. The heat sink layer 1124 is thermally and optically coupled to the NFT aperture 1122.

The wider portion 1107a in this example is about one or more times as wide as the aperture 1122 in the cross track direction. The narrower portion 1107b is significantly narrower than the cross-track width of the aperture 1122, e.g., have a cross-track width on the order of that of notch 1123. The taper between wide and narrower portions 1107a-b may be linear, curved (e.g., parabolic, circular), stepwise, or any combination thereof. The cross-sectional perspective view of FIG. 12 shows a tapered write pole extension 1207 similar to that described in relation to FIG. 11, except that there is no recessed region at the media-facing surface 1208. The extension 1207, aperture 1222, notch 1223 and heat sink layer 1224 may be variously configured as described in relation to other embodiments described herein.

Figure 13:
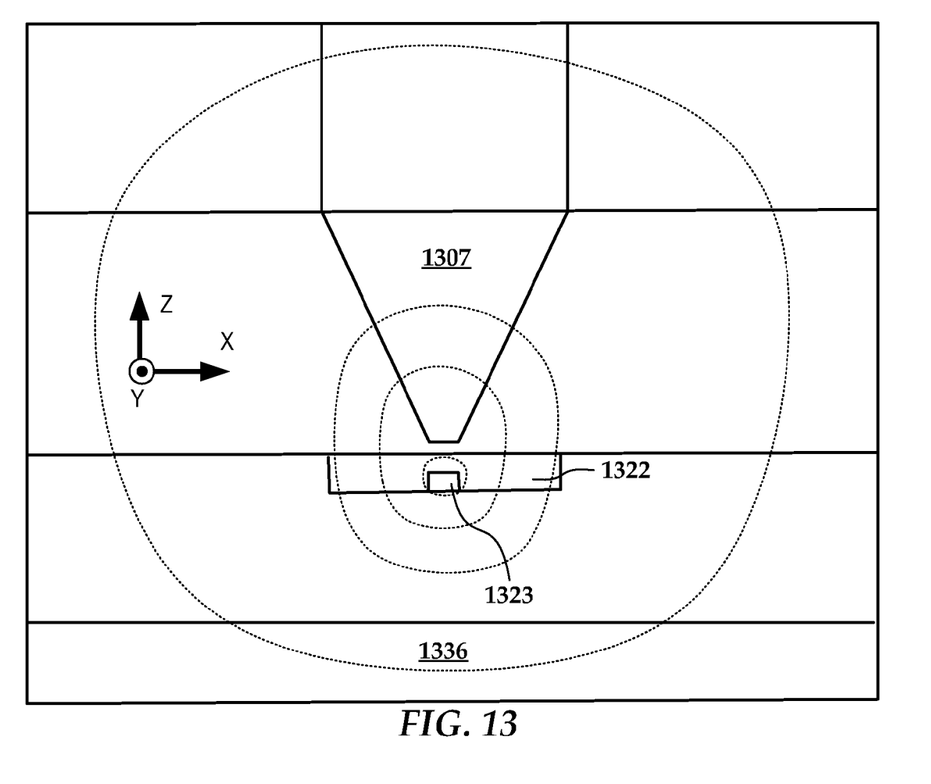
FIG. 13 is a graph illustrating thermal analysis results for a recording head according to another example embodiment.

In FIG. 13, a graph shows a thermal analysis of a write pole configuration according to an example embodiment. The configuration includes a tapered extension 1307 with recessed region at the media-facing surface, similar to that shown in FIG. 11. This configuration also includes a downtrack heat sink 1336, such as region 1036 shown in FIG. 10. The downtrack heat sink 1336 extends 500 nm in the y-direction and has a z-dimension of 300 nm. The y-dimension thickness of the plasmonic material is 110 nm around the aperture 1322, with a thinner layer covering surfaces of the tapered region, e.g., 20 nm between the tip of the extension 1307 and the top of the aperture 1322. The highest temperatures are seen at the notch 1323 within the aperture 1322.

Figure 14:
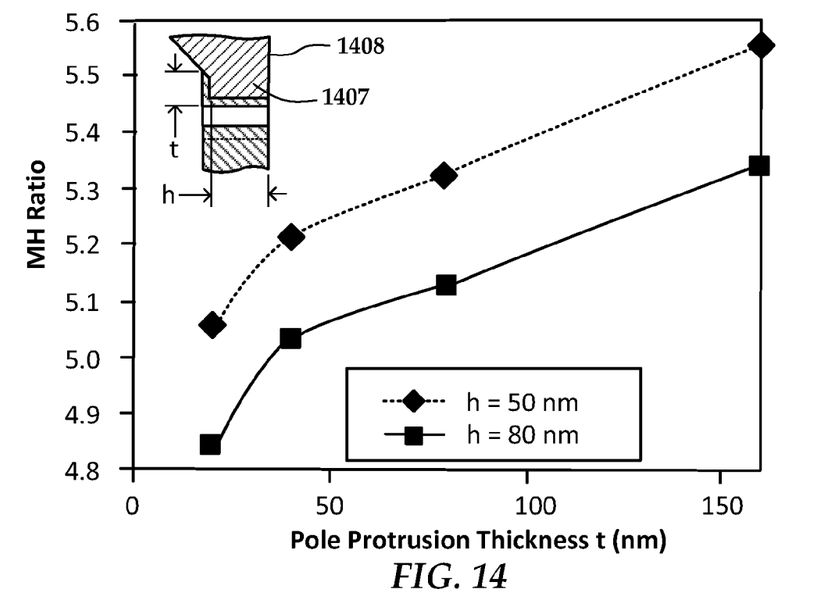
FIG. 14 is a graph illustrating thermal analysis results for write head extension geometries according to example embodiments.

In reference now to FIG. 14, a graph illustrates an analysis of how write pole extension 1407 dimensions affect MH ratio according to an example embodiment. As seen in the graph, the extension thickness t is measured in the downtrack direction and height h is defined normal to media-facing surface 1408. The MH ratio increases with thickness t, and also increases with decreasing height h. The MH ratio can be increased by increasing volume of heat sink layer materials, as well as including downtrack heat sinks, such as regions 1035 and 1036 shown in FIG. 10.

Figure 15:
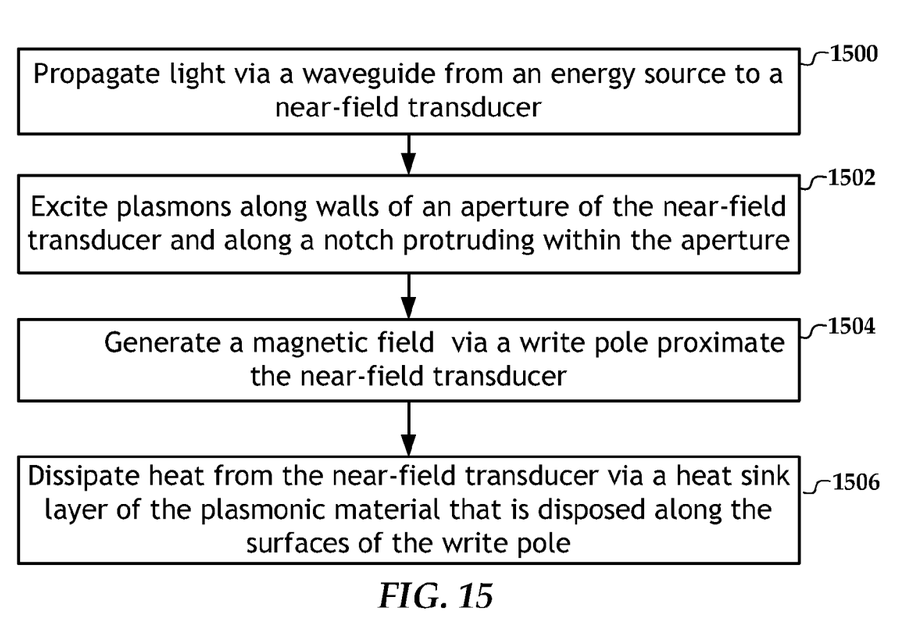
FIG. 15 is a flowchart illustrating a method according to an example embodiment.

In reference now to FIG. 15, a flowchart illustrates a method according to an example embodiment. The method involves propagating 1500 light via a waveguide from an energy source to a near-field transducer near a media-facing surface of a recording head. In response to the light, plasmons are excited 1502 along walls of an aperture of the near-field transducer and along a notch protruding within the aperture. The walls are formed of a plasmonic material and are oriented normal to the media-facing surface such that the walls and the notch direct the plasmons to a recording medium. A magnetic field is generated 1504 at the recording medium via a write pole proximate the near-field transducer. The write pole has a back surface facing away from the media-facing surface and an aperture-facing surface proximate the aperture. Heat is dissipated 1506 from the near-field transducer via a heat sink layer of the plasmonic material that is disposed along the back surface and the aperture-facing surface of the write pole.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A recording head comprising:
   a near-field transducer proximate a media-facing surface, the near-field transducer comprising:
     an aperture surrounded by walls of plasmonic material, the walls oriented normal to the media-facing surface; and
     a notch protruding within the aperture;
   a write pole proximate the near-field transducer, the write pole having a back surface facing away from the media-facing surface and an aperture-facing surface proximate the aperture; and
   a heat sink layer of the plasmonic material along the back surface and the aperture-facing surface of the write pole, the heat sink layer thermally and optically coupled to the near-field transducer.

2. The recording head of claim 1, wherein the write pole comprises a downtrack extension that has a reduced cross-section proximate the near-field transducer, at least part of the back surface and the aperture-facing surface of the write pole being located on the downtrack extension.

3. The recording head of claim 2, wherein the reduced cross-section of the downtrack extension is constant over a downtrack distance near the near-field transducer.

4. The recording head of claim 2, wherein the reduced cross-section of the downtrack extension tapers from a larger cross-track dimension away from the near-field transducer to a smaller cross-track dimension proximate the near-field transducer.

5. The recording head of claim 1, wherein the aperture-facing surface is at a non-normal angle to the media-facing surface such that the aperture-facing surface faces away from the media-facing surface.

6. The recording head of claim 5, wherein the heat sink layer along the aperture-facing surface forms a top wall of the near-field transducer that is normal to the media-facing surface.

7. The recording head of claim 5, wherein the heat sink layer along the aperture-facing surface forms a top wall of the near-field transducer that is at the non-normal angle.

8. The recording head of claim 1, wherein a portion of the write pole includes a recessed region that is recessed from the media-facing surface, wherein the heat sink layer covers the recessed region.

9. The recording head of claim 1, further comprising at least one heat sink region coupled to a wall of the near-field transducer opposite the heat sink layer, the at least one heat sink region extending away from the media-facing surface.

10. A recording head comprising:
  a near-field transducer proximate a media-facing surface, the near-field transducer comprising:
    an aperture surrounded by walls of plasmonic material, the walls oriented normal to the media-facing surface; and
    a notch protruding within the aperture;
  a write pole proximate the near-field transducer, the write pole having a downtrack extension with a reduced cross-section proximate the near-field transducer; and
  a heat sink layer of the plasmonic material along at least two surfaces of the downtrack extension of the write pole, the at least two surfaces comprising an aperture-facing surface of the downtrack extension proximate the near-field transducer, the heat sink layer thermally and optically coupled to the near-field transducer.

11. The recording head of claim 10, wherein the reduced cross-section of the downtrack extension is constant over a downtrack distance near the near-field transducer.

12. The recording head of claim 10, wherein the reduced cross-section of the downtrack extension tapers from a larger cross-track dimension away from the near-field transducer to a smaller cross-track dimension proximate the near-field transducer.

13. The recording head of claim 10, wherein the at least two surfaces comprise a back surface of the downtrack extension facing away from the media-facing surface.

14. The recording head of claim 10, wherein the at least two surfaces comprise a recessed region that is parallel to and recessed from the media-facing surface.

15. The recording head of claim 10, wherein the aperture-facing surface is at a non-normal angle to the media-facing surface such that the aperture-facing surface faces away from the media-facing surface.

16. The recording head of claim 15, wherein the heat sink layer along the aperture-facing surface forms a top wall of the near-field transducer that is normal to the media-facing surface.

17. The recording head of claim 15, wherein the heat sink layer along the aperture-facing surface forms a top wall of the near-field transducer that is at the non-normal angle.

18. The recording head of claim 10, further comprising at least one heat sink region coupled to a wall of the near-field transducer opposite the heat sink layer, the at least one heat sink region extending away from the media-facing surface.

19. A method comprising:
  propagating light via a waveguide from an energy source to a near-field transducer near a media-facing surface of a recording head;
  exciting surface plasmons along walls of an aperture of the near-field transducer and along a notch protruding within the aperture, the walls formed of a plasmonic material and being oriented normal to the media-facing surface, the walls and the notch directing the surface plasmons to a recording medium;
  generating a magnetic field at the recording medium via a write pole proximate the near-field transducer, the write pole having a back surface facing away from the media-facing surface and an aperture-facing surface proximate the aperture; and
  dissipating heat from the near-field transducer via a heat sink layer of the plasmonic material that is disposed along the back surface and the aperture-facing surface of the write pole.

* * * * *